(12) United States Patent
Lee

(10) Patent No.: US 9,637,057 B2
(45) Date of Patent: May 2, 2017

(54) METHOD AND APPARATUS FOR CONTROLLING AUXILIARY STEP ROTATED IN ASSOCIATION WITH DOOR OPENING ANGLE OF VEHICLE

(71) Applicant: Hyundai Motor Company, Seoul (KR)

(72) Inventor: Myung-Kyu Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/943,173

(22) Filed: Nov. 17, 2015

(65) Prior Publication Data

US 2017/0072860 A1 Mar. 16, 2017

(30) Foreign Application Priority Data

Sep. 15, 2015 (KR) .................. 10-2015-0130111

(51) Int. Cl.
*B60R 22/00* (2006.01)
*B60R 3/02* (2006.01)

(52) U.S. Cl.
CPC ..................... *B60R 3/02* (2013.01)

(58) Field of Classification Search
CPC ......................................................... B60R 3/02
USPC ............. 701/49; 182/88, 127; 280/163, 166
See application file for complete search history.

(56) References Cited

U.S. PATENT DOCUMENTS

| | | | |
|---|---|---|---|
| 6,179,312 B1* | 1/2001 | Paschke | B60R 3/02 105/444 |
| 2006/0181049 A1* | 8/2006 | Kobayashi | B60R 3/02 280/166 |
| 2007/0069497 A1* | 3/2007 | Watson | B60R 3/02 280/166 |
| 2009/0273154 A1 | 11/2009 | Kuula | |
| 2016/0023609 A1* | 1/2016 | Watson | B60R 3/002 280/166 |

FOREIGN PATENT DOCUMENTS

| | | |
|---|---|---|
| KP | 2009-0099984 A1 | 9/2009 |
| KR | 1998-039859 U | 9/1998 |
| KR | 20-2000-0005123 U | 3/2000 |
| KR | 10-0803551 B1 | 2/2008 |
| KR | 2013-0065103 A | 6/2013 |

* cited by examiner

*Primary Examiner* — Thomas G Black
*Assistant Examiner* — Luke Huynh
(74) *Attorney, Agent, or Firm* — Mintz Levin Cohn Ferris Glovsky and Popeo, P.C.; Peter F. Corless

(57) ABSTRACT

A method for controlling an auxiliary step rotated in association with a door opening angle of a vehicle may include a start step of sensing the door opening angle of a door of the vehicle, a first determination step of determining whether the sensed door opening angle is zero, a second determination step of determining whether the sensed door opening angle is less than a preset reference angle, when the sensed door opening angle is not zero, and a first control step of rotating the auxiliary step by the sensed door opening angle, when the sensed door opening angle is less than the reference angle.

12 Claims, 5 Drawing Sheets

METHOD AND APPARATUS FOR CONTROLLING AUXILIARY STEP ROTATED IN ASSOCIATION WITH DOOR OPENING ANGLE OF VEHICLE

CROSS-REFERENCE TO RELATED APPLICATION

This application claims the benefit of and priority to Korean Patent Application No. 10-2015-0130111, filed on Sep. 15, 2015, which is incorporated herein by reference in its entirety.

BACKGROUND OF THE DISCLOSURE

Technical Field of the Disclosure

Embodiments of the present disclosure relate generally to a method and apparatus for controlling an auxiliary step rotated in association with a door opening angle of a vehicle, and more particularly, to a method and apparatus for controlling an auxiliary step rotated in association with a door opening angle of a vehicle, which enables a driver to easily get on or off even when the door cannot be fully opened.

Description of Related Art

Generally, larger vehicles or heavy-duty trucks capable of loading goods have a space formed serving as a driver and passenger space and a space for loading. Such vehicles can have a separate step device which a driver or passenger use to get on or off the vehicle, due to the vehicle being positioned at a higher level than a general car.

The conventional step device includes a plurality of fixed steps arranged perpendicularly at the front of the front tire. Thus, the conventional step device has a structure in which a driver gets on or off the vehicle through the side thereof after the door is fully opened. In a wide parking space where the door can be fully opened, the driver has no problem getting on or off the vehicle. However, when such vehicle is parked in a narrow parking lot or rest area, the door may not be fully opened due to the narrow space. In this case, when the driver attempts to get on or off the vehicle, the driver may have difficulty in placing his or her foot on the step, which is arranged at the side of the vehicle.

SUMMARY OF THE DISCLOSURE

Embodiments of the present disclosure are directed to a method and apparatus for controlling an auxiliary step rotated in association with a door opening angle when the door is opened at an angle within a predetermined range.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with embodiments of the present disclosure, there is provided a method for controlling an auxiliary step rotated in association with a door opening angle of a vehicle. The method includes: a start step of sensing the door opening angle of a door of the vehicle; a first determination step of determining whether the sensed door opening angle is zero; a second determination step of determining whether the sensed door opening angle is less than a preset reference angle, when the sensed door opening angle is not zero; and a first control step of rotating the auxiliary step by the sensed door opening angle, when the sensed door opening angle is less than the preset reference angle.

The method may further include a second control step of maintaining a state in which the auxiliary step is not rotated or returning the auxiliary step to the state in which the auxiliary step is not rotated when the sensed door opening angle is zero.

The second control step may be performed when the sensed door opening angle is greater than or equal to the preset reference angle.

The preset reference angle may be a maximum angle at which the door can be opened.

Furthermore, in accordance with embodiments of the present disclosure, there is provided an apparatus for controlling an auxiliary step rotated in association with a door opening angle of a vehicle. The apparatus includes: a storage medium configured to store program instructions for executing the method for controlling the auxiliary step rotated in association with the door opening angle of the vehicle described above; a sensor configured to sense the door opening angle of a door of the vehicle; an auxiliary step configured to be rotated in association with the door opening angle; a motor arranged on a hinge shaft of the auxiliary step and configured to rotate the auxiliary step; and a controller configured to control the motor according to the program instructions stored in the storage medium based on the door opening angle sensed by the sensor.

The apparatus may further include a hinge part rotatably coupling a body of the vehicle and the door.

The hinge part may include a hinge fixation part fixed to the body of the vehicle.

The hinge part may further include a hinge rotation part fixed to the door and configured to rotate with respect to the hinge fixation part.

The sensor may include a first sensor mounted on the hinge fixation part.

The sensor may further include a second sensor mounted on the hinge rotation part.

The door opening angle may be sensed according to a relative positional difference between the first and second sensors.

Figure 1:
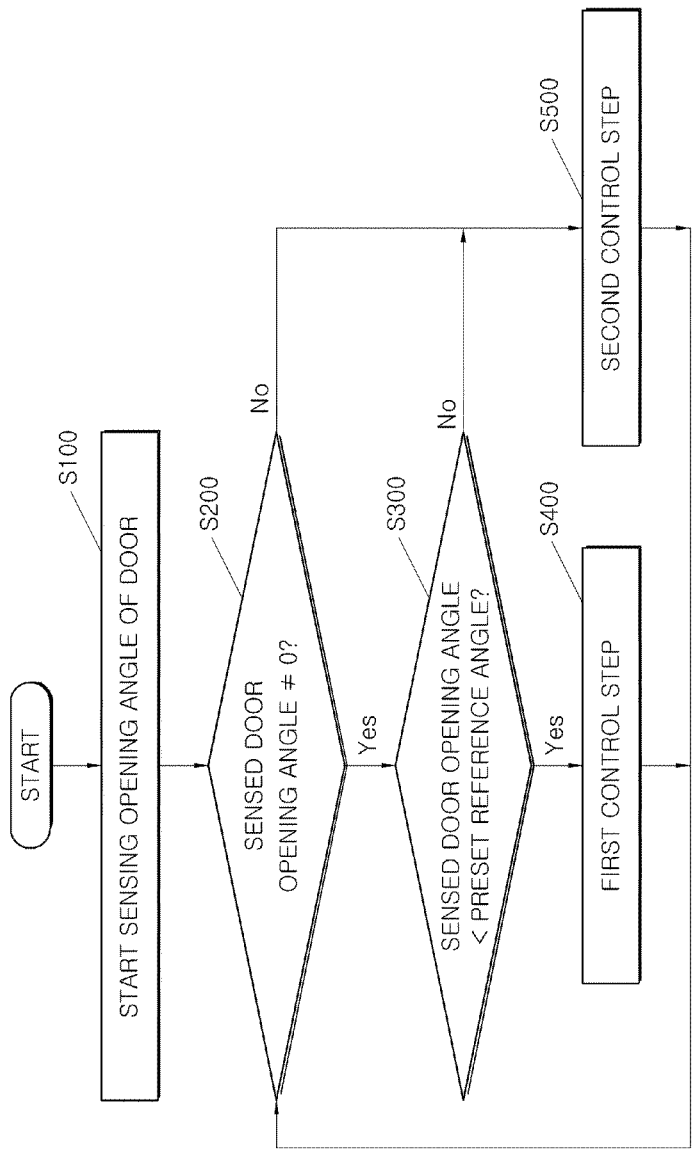
FIG. 1 is a flowchart illustrating a method for controlling an auxiliary step rotated in association with a door opening angle of a vehicle in accordance with embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the disclosed embodiments, FIG. 1 is a flowchart illustrating a method for controlling an auxiliary step rotated in association with a door opening angle of a vehicle in accordance with embodiments of the present disclosure. As shown in FIG. 1, the method for controlling an auxiliary step rotated in association with a door opening angle of a vehicle in accordance with embodiments of the present disclosure includes a start step S 100 of starting sensing a door opening angle; a first determination step S200 of determining whether the sensed door opening angle is zero or not; a second determination step S300 of determining whether the sensed door opening angle is less than a preset reference angle, when the sensed door opening angle is not zero; and a first control step S400 of rotating the auxiliary step by the sensed door opening angle, when the sensed door opening angle is less than the preset reference angle.

That is, when the sensed door opening angle is between zero and the preset reference angle, the auxiliary step is rotated by the same angle as the sensed door opening angle. Thus, even when the door cannot be fully opened, a driver can easily place a foot on the rotated auxiliary step to get on or off the vehicle (refer to FIG. 5).

The method for controlling an auxiliary step rotated in association with a door opening angle of a vehicle further includes a second control step S500 of maintaining the state in which the auxiliary step is not rotated or returning the auxiliary step to the state in which the auxiliary step is not rotated, when the sensed door opening angle is zero.

That is, the auxiliary step does not need to protrude to the outside of the vehicle body in a state where the door is closed. Rather, when the auxiliary step protrudes to the outside of the vehicle body, air resistance is caused to degrade the fuel efficiency, and the auxiliary step is likely to collide with an external object. Thus, the auxiliary step is returned to the state in which the auxiliary step is not rotated.

When the sensed door opening angle is equal to or more than the preset reference angle, the second control step S500 is performed. The preset reference angle may be set to the maximum angle at which the door can be opened. That is, since the driver can get on or off through the side of the vehicle when the door is fully opened, the driver does not need to use the auxiliary step in order to get on or off. The preset reference angle may be changed according to the type of the vehicle.

Figure 2:
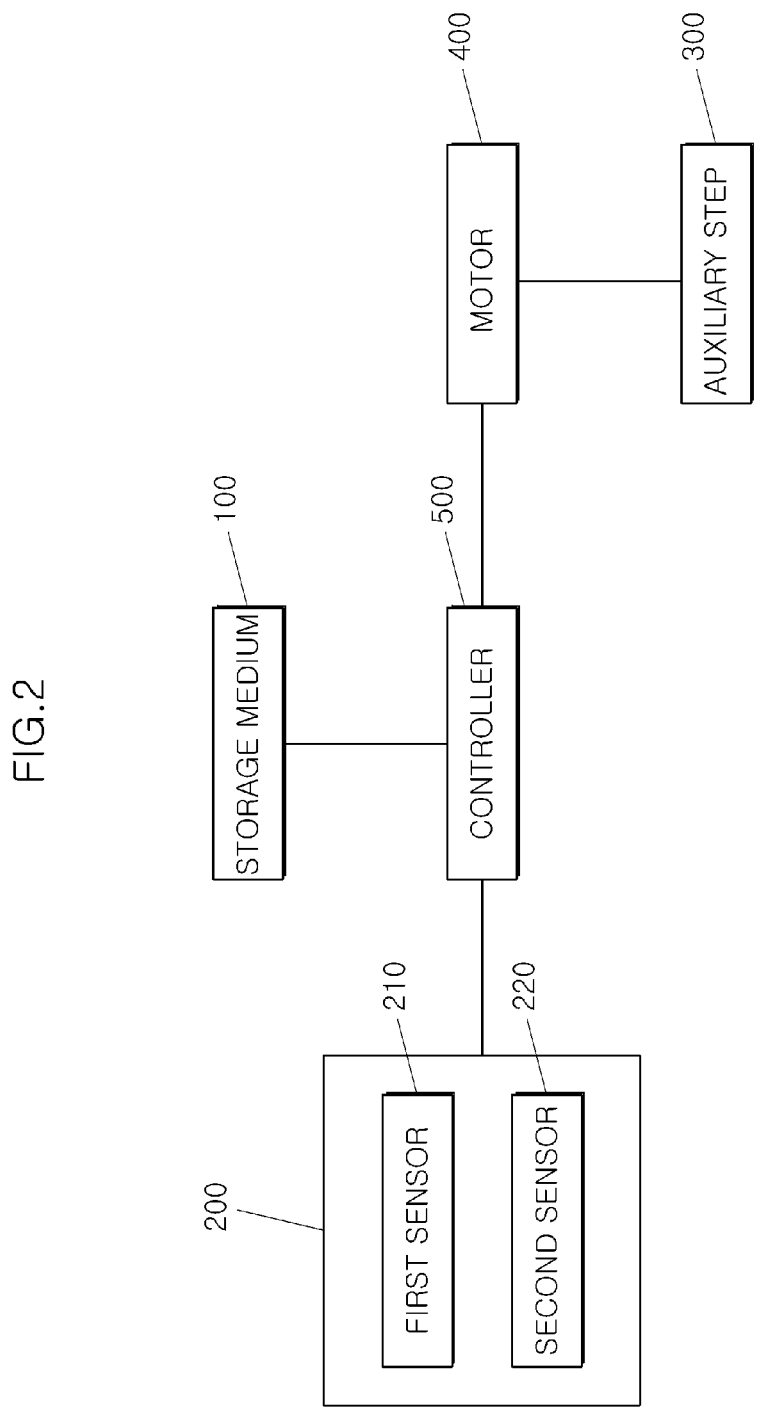
FIG. 2 is a block diagram of an apparatus for controlling an auxiliary step rotated in association with a door opening angle of a vehicle in accordance with embodiments of the present disclosure.
Figure 3:
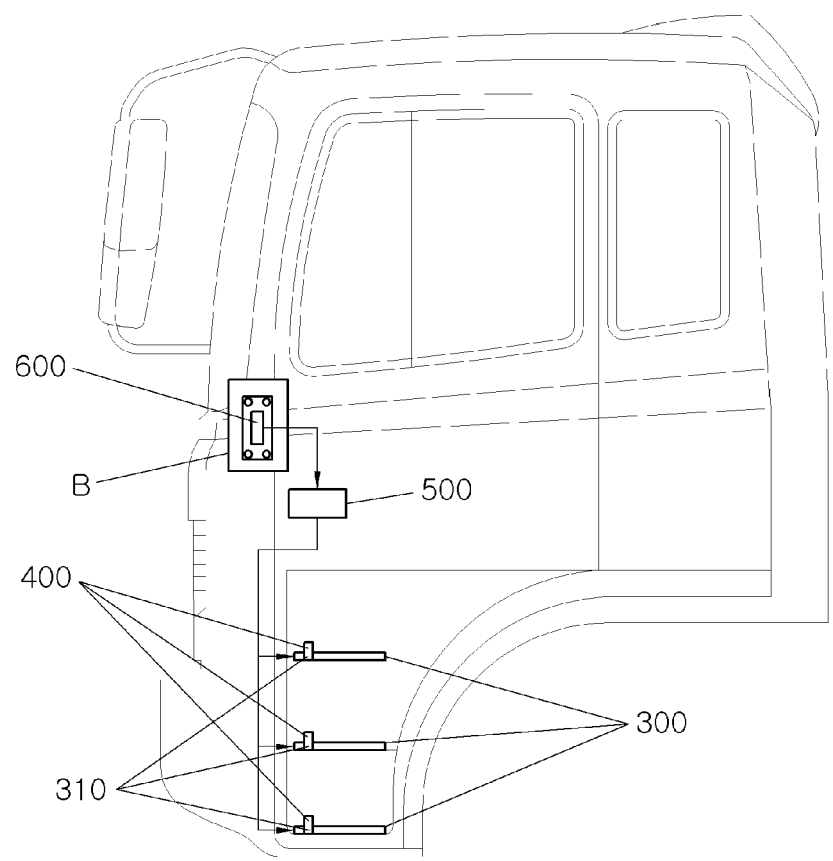
FIG. 3 is a perspective view of the auxiliary step rotated in association with a door opening angle of a vehicle in accordance with embodiments of the present disclosure.
Figure 4:
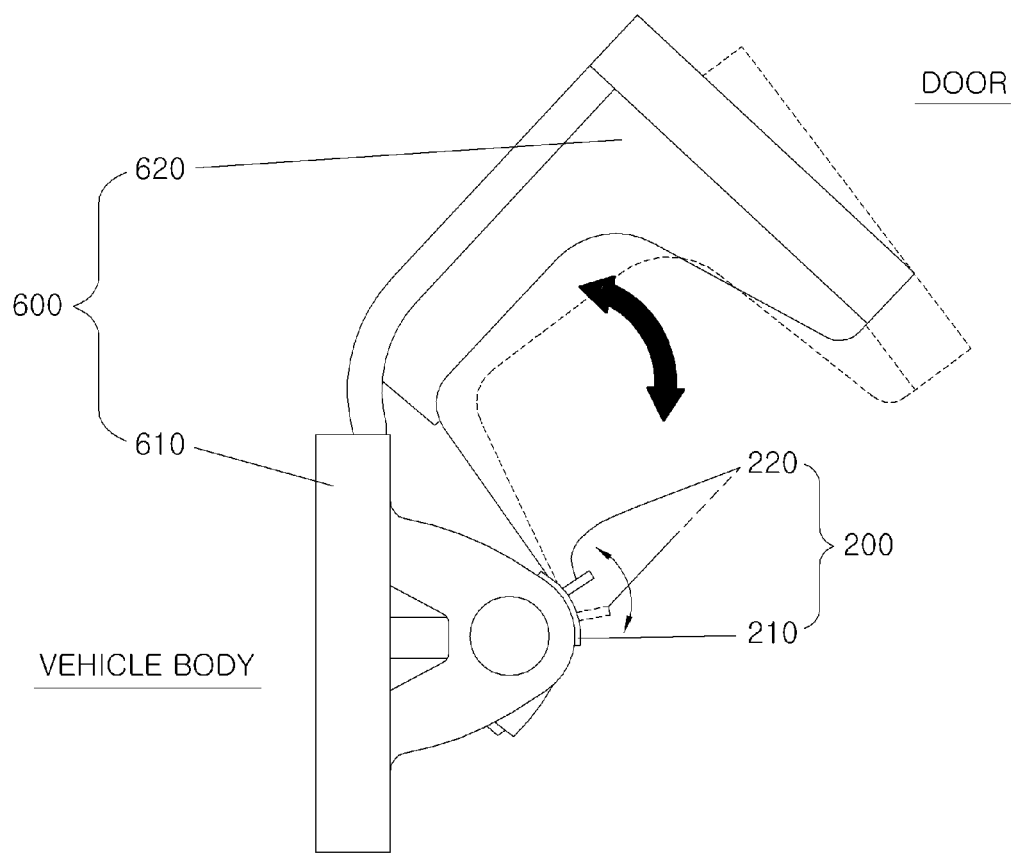
FIG. 4 is an expanded view of a portion B in FIG. 3.
Figure 5:
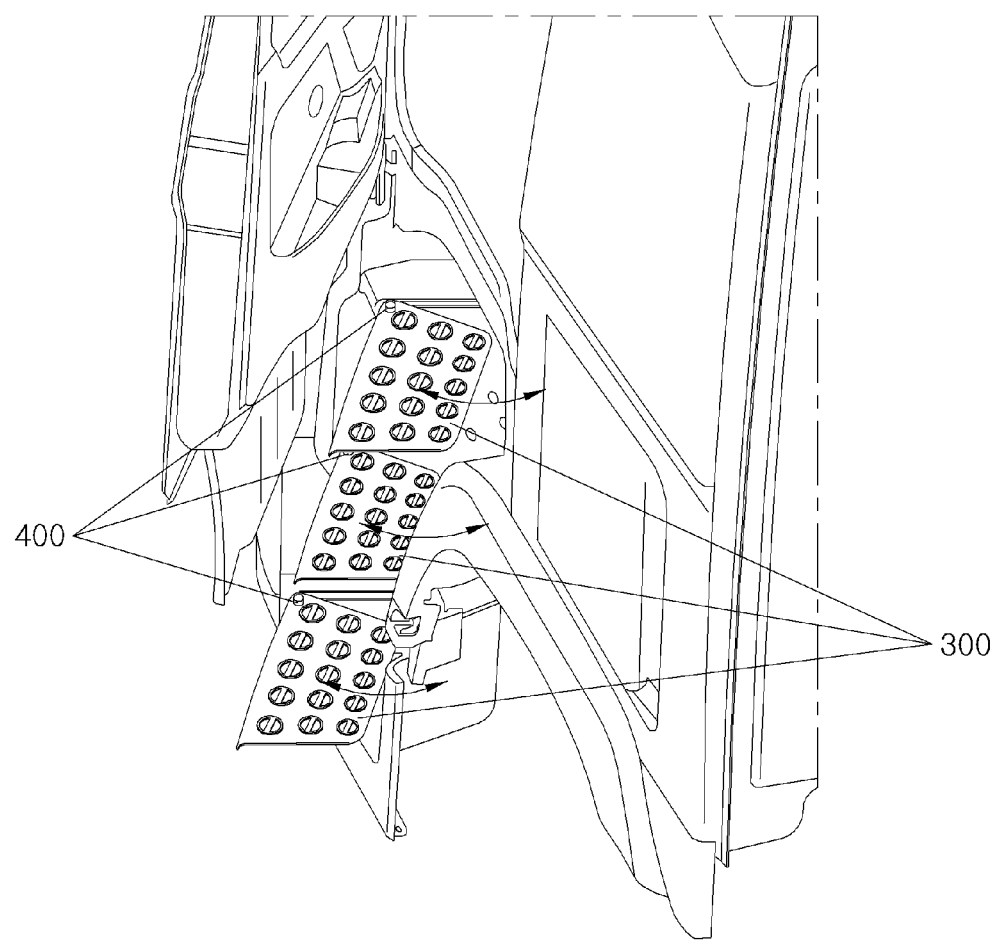
FIG. 5 is a diagram illustrating an operation state of the auxiliary step rotated in association with a door opening angle of a vehicle in accordance with embodiments of the present disclosure.

FIG. 2 is a block diagram of an apparatus for controlling an auxiliary step rotated in association with a door opening angle of a vehicle in accordance with embodiments of the present disclosure. FIG. 3 is a perspective view of the auxiliary step rotated in association with a door opening angle of a vehicle in accordance with embodiments of the present disclosure. FIG. 4 is an expanded view of a portion B in FIG. 3. FIG. 5 is a diagram illustrating an operation state of the auxiliary step rotated in association with a door opening angle of a vehicle in accordance with embodiments of the present disclosure. Referring to FIGS. 2 to 5, the apparatus for controlling the auxiliary step rotated in association with a door opening angle of a vehicle in accordance with another embodiment of the present disclosure includes a storage medium 100, a sensor 200, an auxiliary step 300, a motor 400, a controller 500, and a hinge part 600.

The storage medium 100 stores the method for controlling an auxiliary step rotated in association with a door opening angle of a vehicle.

The sensor 200 senses the opening angle of the door. The arrangement and detailed configuration of the sensor will be described below.

The auxiliary step 300 is rotated in association with the opening angle of the door. The auxiliary step 300 may be mounted on a heavy-duty truck and arranged on the top surface of a step device which helps a driver to get on or off. Furthermore, the auxiliary step 300 may be arranged in the step device, and protrude to the outside only when being rotated.

The motor 400 is arranged on a hinge shaft 310 of the auxiliary step 300, and serves to rotate the auxiliary step 300.

The controller 500 controls the motor 400 according to the control method stored in the storage medium 100, based on the door opening angle sensed by the sensor 200. That is, when the door opening angle is between zero and a preset reference angle, the controller 500 drives the motor 400 to rotate the auxiliary step 300 by the same angle as the sensed door opening angle. Furthermore, when the door is closed, the controller 500 controls the motor 400 so as not to rotate the auxiliary step 300, and when the door is fully opened, the controller 500 controls the motor 400 to return the auxiliary step 300 to the state in which the auxiliary step 300 is not rotated.

The hinge part 600 rotatably couples the vehicle body and the door. The hinge part 600 includes a hinge fixation part 610 fixed to the vehicle body; and a hinge rotation part 620 fixed to the door and rotated with respect to the hinge fixation part 610.

The sensor 200 includes a first sensor 210 mounted on the hinge fixation part 610 and a second sensor 220 mounted on the hinge rotation part 620, and senses the opening angle of the door based on a relative positional difference between the first and second sensors 210 and 220. That is, according to the door opening angle sensed by the sensor 200, the controller 500 controls the motor 400 in order to determine whether to rotate the auxiliary step 300 or set the rotation angle of the auxiliary step 300.

For example, when the door is closed, the second sensor 220 is rotated beyond the recognition range of the first sensor 210. Thus, the door opening angle may be sensed as zero. Furthermore, when the sensed door opening angle is between zero and the preset reference angle, the first sensor 210 may recognize the position of the second sensor 220, and sense the opening angle of the door. Furthermore, when the sensed door opening angle is equal to or more than the preset reference angle, the second sensor 220 is rotated beyond the recognition range of the first sensor 210. At this time, since the second sensor 220 is rotated in the opposite direction as the rotation direction when the door is closed, the second sensor 220 may sense that the door is fully opened.

In accordance with the embodiments of the present disclosure, the method and apparatus for controlling an auxiliary step rotated in association with a door opening angle of a vehicle enables a driver to easily get on or off the vehicle, even when the door cannot be fully opened because a parking lot is narrow.

While the present disclosure has been described with respect to the specific embodiments, it will be apparent to those skilled in the art that various changes and modifications may be made without departing from the spirit and scope of the disclosure as defined in the following claims.

What is claimed is:

1. A method for controlling an auxiliary step rotated in association with a door opening angle of a vehicle, the method comprising:
   a start step of sensing the door opening angle of a door of the vehicle;
   a first determination step of determining whether the sensed door opening angle is zero;
   a second determination step of determining whether the sensed door opening angle is less than a preset reference angle when the sensed door opening angle is not zero; and
   a first control step of rotating the auxiliary step by the sensed door opening angle when the sensed door opening angle is less than the preset reference angle,
   wherein when the sensed door opening angle is between zero and the preset reference angle, the auxiliary step is rotated by a same angle as the sensed door opening angle.

2. The method of claim 1, further comprising:
   a second control step of maintaining a state in which the auxiliary step is not rotated or returning the auxiliary step to the state in which the auxiliary step is not rotated when the sensed door opening angle is zero.

3. The method of claim 2, wherein the second control step is performed when the sensed door opening angle is greater than or equal to the preset reference angle.

4. The method of claim 1, wherein the preset reference angle is a maximum angle at which the door can be opened.

5. An apparatus for controlling an auxiliary step rotated in association with a door opening angle of a vehicle, the apparatus comprising:
   a storage medium configured to store program instructions for executing the method for controlling the auxiliary step rotated in association with the door opening angle of the vehicle according to claim 1;
   a sensor configured to sense the door opening angle of a door of the vehicle;
   an auxiliary step configured to be rotated in association with the door opening angle;
   a motor arranged on a hinge shaft of the auxiliary step and configured to rotate the auxiliary step; and
   a controller configured to control the motor according to the program instructions stored in the storage medium based on the door opening angle sensed by the sensor.

6. The apparatus of claim 5, further comprising:
   a hinge part rotatably coupling a body of the vehicle and the door.

7. The apparatus of claim 6, wherein the hinge part includes a hinge fixation part fixed to the body of the vehicle.

8. The apparatus of claim 7, wherein the hinge part further includes a hinge rotation part fixed to the door and configured to rotate with respect to the hinge fixation part.

9. The apparatus of claim 8, wherein the sensor includes a first sensor mounted on the hinge fixation part.

10. The apparatus of claim 9, wherein the sensor further includes a second sensor mounted on the hinge rotation part.

11. The apparatus of claim 10, wherein the door opening angle is sensed according to a relative positional difference between the first and second sensors.

12. A non-transitory computer readable medium containing program instructions for controlling an auxiliary step rotated in association with a door opening angle of a vehicle, the non-transitory computer readable medium comprising:
   program instructions that determine whether a sensed door opening angle of a door of the vehicle is zero;
   program instructions that determine whether the sensed door opening angle is less than a preset reference angle when the sensed door opening angle is not zero; and
   program instructions that rotate the auxiliary step by the sensed door opening angle when the sensed door opening angle is less than the preset reference angle, wherein when the sensed door opening angle is between zero and the preset reference angle, the auxiliary step is rotated by a same angle as the sensed door opening angle.

* * * * *